US012145265B2

United States Patent
Beyerlein et al.

(10) Patent No.: US 12,145,265 B2
(45) Date of Patent: Nov. 19, 2024

(54) PIVOT JOINT

(71) Applicant: Festo SE & Co. KG, Esslingen (DE)

(72) Inventors: Thomas Beyerlein, Stuttgart (DE); Christian Bäurle, Bissingen (DE); Achim Fischer, Filderstadt (DE)

(73) Assignee: Festo SE & Co., KG, Esslingen (DE)

( * ) Notice: Subject to any disclaimer, the term of this patent is extended or adjusted under 35 U.S.C. 154(b) by 0 days.

(21) Appl. No.: 18/315,196

(22) Filed: May 10, 2023

(65) Prior Publication Data
US 2023/0364780 A1 Nov. 16, 2023

(30) Foreign Application Priority Data
May 11, 2022 (DE) ...................... 10 2022 111 767.7

(51) Int. Cl.
*B25J 9/14* (2006.01)
*B25J 19/00* (2006.01)
(Continued)

(52) U.S. Cl.
CPC ............. *B25J 9/14* (2013.01); *B25J 19/0004* (2013.01); *F15B 11/006* (2013.01);
(Continued)

(58) Field of Classification Search
CPC ................... F15B 11/006; F15B 11/024; F15B 2011/0243; F15B 2011/0246; F15B 11/06;
(Continued)

(56) References Cited

U.S. PATENT DOCUMENTS 4,667,475 A * 5/1987 Wesman .................... B25J 9/14
901/17
6,502,393 B1 * 1/2003 Stephenson ........... F16K 31/408
60/424
(Continued)

FOREIGN PATENT DOCUMENTS

| DE | 10 2018 205 636 | 10/2019 |
|----|-----------------|---------|
| DE | 10 2019 211 992 | 2/2021 |
| WO | 2016/023569 | 2/2016 |

OTHER PUBLICATIONS

Examination Report issued in corresponding German Patent Application No. 10 2022 111 767.7, Mar. 27, 2023.

*Primary Examiner* — Michael Leslie
(74) *Attorney, Agent, or Firm* — HSML P.C.

(57) ABSTRACT

A pivot joint for a robot, including a double-acting pneumatic pivot actuator, which has a first working chamber with a first working port and a second working chamber with a second working port, and further including a valve arrangement having a first valve group for a selective connection of the first working port to one of a pressurization port and an exhaust port, and having a second valve group for a selective connection of the second working port to one of the pressurization port and the exhaust port. The valve arrangement includes a safety valve which is connected to the first working port and to the second working port and which is configured for blocking a connection between the first working port and the second working port in a blocking position and for releasing the connection between the first working port and the second working port in a release position.

9 Claims, 1 Drawing Sheet

(51) Int. Cl.
  *F15B 11/00* (2006.01)
  *F15B 11/024* (2006.01)
  *F15B 11/06* (2006.01)
  *F15B 13/04* (2006.01)
  *F15B 19/00* (2006.01)

(52) U.S. Cl.
  CPC ............ *F15B 11/024* (2013.01); *F15B 11/06* (2013.01); *F15B 13/0401* (2013.01); *F15B 19/005* (2013.01)

(58) Field of Classification Search
  CPC ......... F15B 11/068; F15B 19/005; B25J 9/14; B25J 19/0004
  See application file for complete search history.

(56) References Cited

U.S. PATENT DOCUMENTS

| | | | | |
|---|---|---|---|---|
| 6,691,604 | B1 * | 2/2004 | Hajek, Jr. | F15B 11/006 91/464 |
| 7,380,398 | B2 * | 6/2008 | Pfaff | F15B 21/14 91/454 |
| 10,697,476 | B2 * | 6/2020 | Wirtl | F15B 11/10 |
| 10,731,676 | B2 * | 8/2020 | Beger | F15B 11/006 |
| 11,028,862 | B2 * | 6/2021 | Pogatschnigg | E02F 9/2296 |
| 11,578,736 | B2 * | 2/2023 | Klassen | F15B 19/002 |
| 11,835,068 | B2 * | 12/2023 | Paech | F15B 11/006 |
| 2023/0383770 | A1 * | 11/2023 | Bellingrodt | F16K 31/126 |

\* cited by examiner

PIVOT JOINT

This application claims priority to German application 10 2022 111 767.7, filed May 11, 2022, which is incorporated by reference.

The invention relates to a pivot joint for a robot, which comprises a double-acting pneumatic pivot actuator, which has a first working chamber with a first working port and a second working chamber with a second working port and with which a valve arrangement is associated, which is designed for safety-oriented pneumatic control of the pivot actuator.

DE 10 2019 211 992 A1 discloses a fluidic system comprising: a fluidic actuator with a first pressure chamber and an actuator member on which a fluidic driving force can be exerted by applying a pressure fluid to the first pressure chamber in order to change the position of the actuator member, a control valve device which is designed, for controlling the position of the actuator member, selectively connecting the first pressure chamber to a pressure fluid supply line for supplying the pressure fluid to the first pressure chamber or to a pressure fluid sink for discharging the pressure fluid from the first pressure chamber, a safety device for providing a safety condition, in which no fluidic driving force is exerted on the actuator member, the safety device comprising a first check valve connected in parallel with the control valve device between the first pressure chamber and the pressure fluid supply line, and a safety valve which is configured to allow in a safety switching position a connection between the pressure fluid supply line to the pressure fluid sink, so that pressure fluid present in the first pressure chamber can be discharged via the first check valve and the pressure fluid supply line into the pressure fluid sink in order to provide the safety condition.

SUMMARY OF THE INVENTION

The task of the invention is to provide a pivot joint for a robot with which increased safety requirements, such as those to be observed in direct cooperation between robot and human, can be realized.

This task is solved for a pivot joint of the aforementioned type in that the valve arrangement comprises a first valve group for a selective fluid connection of the first working port with a pressurization port and with an exhaust port, and which comprises a second valve group for a selective fluid connection of the second working port with the pressurization port and with the exhaust port, and which further comprises a safety valve (in particular a check valve) connected to the first working port and to the second working port for blocking a fluid connection between the first working port and the second working port in a blocking position and for releasing the fluid connection between the first working port and the second working port in a releasing position.

The valve arrangement serves to ensure coordinated, in particular independent, pressurization and ventilation of both the first working chamber and the second working chamber of the pneumatic pivot actuator, the two working chambers being separated from one another in a sealing manner by a pivot vane accommodated in a pivot-movable manner in an actuator housing and each working chamber being designed to be variable in size.

The pivot vane is in turn connected to an output shaft so that a pivot movement of the pivot vane relative to the actuator housing can be transmitted to a downstream component such as, for example, a subsequent arm section of a robot arm.

Thus, in a normal operating condition for the pivot joint the pivot actuator can be used to pivot the subsequent arm section of the robot arm relative to a preceding arm section of the robot arm coupled to the actuator housing of the pneumatic pivot joint. During this normal operating condition, a pressure difference between the first working chamber and the second working chamber is induced by means of the first valve group and the second valve group, thereby producing the desired pivoting motion of the pivoting arm and the associated output shaft relative to the actuator housing. Furthermore, the first valve group and the second valve group can be used to bring about an equalization of the fluid pressure in the first working chamber and the fluid pressure in the second working chamber, thereby bringing about a standstill for the pneumatic pivot actuator.

Since during operation of a robot equipped with at least one such pivot joint, hazardous situations and malfunctions that may result, for example, from malfunctions of the first valve group and/or the second valve group must be avoided, a safety valve (in particular a check valve) is assigned to the pneumatic pivot actuator. This safety valve can be triggered, for example, by a user working together with the robot by actuating an emergency stop switch in order to transfer the pneumatic pivot actuator to a safe state as quickly as possible. This safe state can, for example, consist of preventing movement of the pneumatic pivot actuator and the associated arm parts of the robot arm as quickly as possible.

In order to be able to ensure this safe state quickly and reliably, the safety valve is connected to the first working port and to the second working port and is designed in a release position for releasing a fluidically communicating connection between the first working port and the second working port. The safety valve assumes this release position, for example, after actuation of an emergency stop switch. In normal operation, however, the safety valve assumes a blocking position in which a fluidically communicating connection between the first working port and the second working port is blocked.

From a pneumatic point of view, the task of the safety valve is to bring about rapid pressure equalization between the first working chamber and the second working chamber of the pneumatic pivot actuator in the release position. This prevents a possible preceding pivot movement of the pivot actuator from being continued, since the pressure difference between the first working chamber and the second working chamber required for the further movement is reduced as quickly as possible.

Thus, the safety valve has the task of ensuring the fluidically communicating connection between the first working port and the second working port in the release position and thus eliminating the pressure difference between the first working chamber and the second working chamber. Further, the safety valve is configured in the blocking position such that a pressure difference between the first working chamber and the second working chamber can be established by means of the first valve group and the second valve group, wherein the fluidically communicating connection between the first working port and the second working port is blocked.

Preferably, the safety valve is designed as a switching valve, in particular as a check valve, whereby control of the safety valve can optionally be provided electrically or fluidically. For example, the safety valve is designed as a solenoid valve or as a fluidically pilot-controlled valve.

Particularly preferably, the safety valve is arranged in the immediate vicinity of the pivot actuator in order to ensure a fast reaction time for the pressure equalization between the first working chamber and the second working chamber by means of the shortest possible fluid line lengths.

Advantageous further developments of the invention are the subject of the sub-claims.

It is expedient if the safety valve is connected to the exhaust port and is designed in the blocking position for blocking a connection between the first working port and the second working port and the exhaust port, and if the safety valve is designed in the release position for releasing the connection between the first working port and the second working port and the exhaust port. By connecting the first working port and the second working port to the exhaust port, a lowering of the pressure level in the first working chamber and in the second working chamber is achieved in addition to the pressure equalization between the first working chamber and the second working chamber. Thus, the pivot actuator, which already assumes the safe state due to the pressure equalization between the first working chamber and the second working chamber, is transferred to an energy-free state within a structurally predetermined period of time required for the reduction of the overpressure present in the first working chamber and in the second working chamber against an ambient pressure, whereby an even higher safety level for the pivot joint can be realized.

The safety valve is configured in such a way that a pressure drop already occurs in the two working chambers during pressure equalization between the first working chamber and the second working chamber. This pressure drop continues after pressure equalization between the two working chambers until a pressure level is reached in both working chambers that at least almost corresponds to the ambient pressure in the vicinity of the pivot joint.

By way of example, the safety valve is designed as a 3/2-way valve in which there is no fluidic communicating connection between the total of three valve ports in the shut-off position, while a fluidic communicating connection between all three valve ports is ensured in the release position. Preferably, the first working port is connected to the first valve port of the safety valve, the second working port is connected to the second valve port of the safety valve, and the exhaust port is connected to the third valve port of the safety valve.

It is advantageous if the safety valve has an actuator for switching a valve member between the release position and the blocking position and if the safety valve has a spring which is designed for biasing the valve member of the safety valve into the release position. The task of the actuator is to switch the valve member of the safety valve between the release position and the blocking position. The actuator is an integral part of the safety valve and acts on the valve member movably mounted in a valve housing of the safety valve. This valve member is used to control the desired blocking and/or release of the fluidically communicating connection between, for example, the three valve ports of the safety valve. For example, a valve seat can be formed in the valve housing, which is opened or closed depending on the position of the valve member and thus influences the blocking or release of the fluidically communicating connection between the valve ports.

The actuator that can be used to move the valve member is, for example, an electro-magnetic actuator, so that the safety valve is designed as a magnet valve or solenoid, or a fluid actuator, so that the safety valve is designed as a fluidically pilot-controlled valve. Accordingly, either an electric or a fluidic actuation of the actuator is to be provided. Other valve designs, for example using piezo actuators, piezo stacks or other active valve members, are also conceivable.

In an example, the valve member is spring-loaded and biased into the release position. Alternatively, a separately formed spring is assigned to the valve member, which ensures that the valve member is preloaded into the release position.

In any case, the safety valve assumes the release position in a de-energized state in which there is no electrical and/or pneumatic actuation of the actuator. In this way, the design of the safety valve already supports the safe state for the pivot actuator, for example in the event that no specific control of the actuator is possible, as could be the case, for example, in the event of a power failure and/or a failure of the pneumatic supply.

In a further embodiment of the invention, it is provided that a choke is arranged between the safety valve and the exhaust port. The task of the choke is to ensure a defined pressure reduction in the first working chamber and in the second working chamber already during the execution of the pressure equalization and also after the execution of the pressure equalization between the first working chamber and the second working chamber.

Preferably, a choke cross-section of the choke is selected to be larger than a supply cross-section of the first valve group and larger than a supply cross-section of the second valve group. This measure prevents that in case of a malfunction in the first valve group and/or in the second valve group a resulting maintenance of the compressed air supply for the first working chamber or the second working chamber leads to a pressure increase in the two working chambers, which is basically symmetrical, if the safety valve is in the release position. Rather, even in this case of unwanted but continued air supply, the connection of the first working port and the second working port to the exhaust port ensures not only the pressure equalization between the first working chamber and the second working chamber, but also the desired pressure reduction in the first working chamber and the second working chamber.

It is advantageous if two switching valves connected in parallel are provided. Preferably there is a second safety valve (in particular a check valve) arranged in parallel to the safety valve to increase the safety level of the pivot joint. If only the first fault case is considered for the pivot joint, in which a malfunction of a safety valve is also to be considered, the use of two fluidically parallel switched safety valves excludes a dangerous situation caused by the pivot joint for this first fault case. Particularly preferably, the two fluidically parallel-connected safety valves are implemented with different actuation systems and/or different valve technologies in order to ensure diverse redundancy for the safety valves.

It is advantageous if a first, separately designed control is assigned to one of the two safety valves, which is designed to control the actuator of this safety valve, and if a second, separately designed control is assigned to the other of the two safety valves, which is designed to control the actuator of this safety valve. The separate design of the controls for the two actuators of the two safety valves is intended to prevent a defect in one control from leading to a failure of both safety valves, as could possibly be the case with a common control. Furthermore, the separate design of the two controls enables the individual control of the respective assigned actuator with the required type of energy in a simple manner.

In an advantageous further development of the invention, it is provided that a first pressure sensor is assigned to the first working port or to the first working chamber, which first pressure sensor provides a first pressure signal to the first control, and that a second pressure sensor is assigned to the second working port or the second working chamber, which second pressure sensor provides a second pressure signal to the second control. The first pressure sensor and the second pressure sensor can thus be used to determine a pressure level at the respective working port and/or in the respective working chamber, which is of particular interest for checking the function of the safety valves and, if applicable, the respective downstream chokes. For example, after the safety functions have been triggered and the safety valves have been switched from the blocking position to the release position, a pressure curve can be determined for the respective working chamber, which pressure curve can be compared with a predefined pressure curve to enable statements to be made as to whether there are any impairments to the safety valves or the chokes.

It is useful if a brake biased into a braking position and a brake control are assigned to the pivot actuator, the brake control being designed for switching the brake between the braking position for the pivot actuator and a release position for the pivot actuator. The s task of the brake and the associated brake control is to brake and/or completely prevent the pivot movement of the pivot actuator. For this purpose, the brake, which in the braking position is provided in particular for frictional and/or positive contact with a moving component of the pivot actuator, has an internal bias which is directed into the braking position, so that the brake remains in the braking position without a supply of electrical or pneumatic energy by the brake control. The brake control is accordingly designed to switch the brake from the braking position to the release position and to effect this switchover by supplying electrical or fluid energy to the brake. Preferably, it is provided that the brake comprises a spring, in particular a helical spring, a diaphragm spring arrangement or an air spring, and is biased into the brake position by this spring energy stored in the spring.

Furthermore, it can be provided that the brake has a fluid-tight working chamber, the size of which can be changed by pressurization in such a way that a braking element belonging to the brake is transferred from a braking position for the pivot actuator to a release position for the pivot actuator. Alternatively, a magnetic drive or another electrical drive is assigned to the brake, with which the brake position can be released as long as electrical energy is provided by the brake control.

It is advantageous if the brake control and the first valve group and the second valve group and the first control and the second control are each electrically connected to a valve control system and if the valve control system is designed to carry out a test procedure in such a way that the brake control system is able to control the brake application, in that the brake control brings about the braking state for the pivot actuator and in that an asymmetrical pressurization of the pivot actuator is brought about with the first valve group and/or the second valve group, and in that a switchover of at least one safety valve from the blocking position to the release position is carried out, and in that a monitoring of a pressure change at the first working port and/or at the second working port is carried out.

Such a test method can be used to determine whether the function of at least one of the two safety valves required to ensure safe operation of the pivot joint is guaranteed, in particular whether the function of both safety valves is guaranteed. Only in this case shall further operation of the pivot joint be permissible. If a deviation between an actual pressure change at the first working port and/or at the second working port and a specified pressure change, in particular a pressure change stored in the valve control system, which exceeds a threshold value should occur during the test procedure, the valve control system will prevent further operation of the pivot joint and issue a fault message.

BRIEF DESCRIPTION OF THE DRAWINGS

An advantageous embodiment of the invention is shown in the drawing. Here shows.

DETAILED DESCRIPTION OF THE INVENTION

Figure 1:
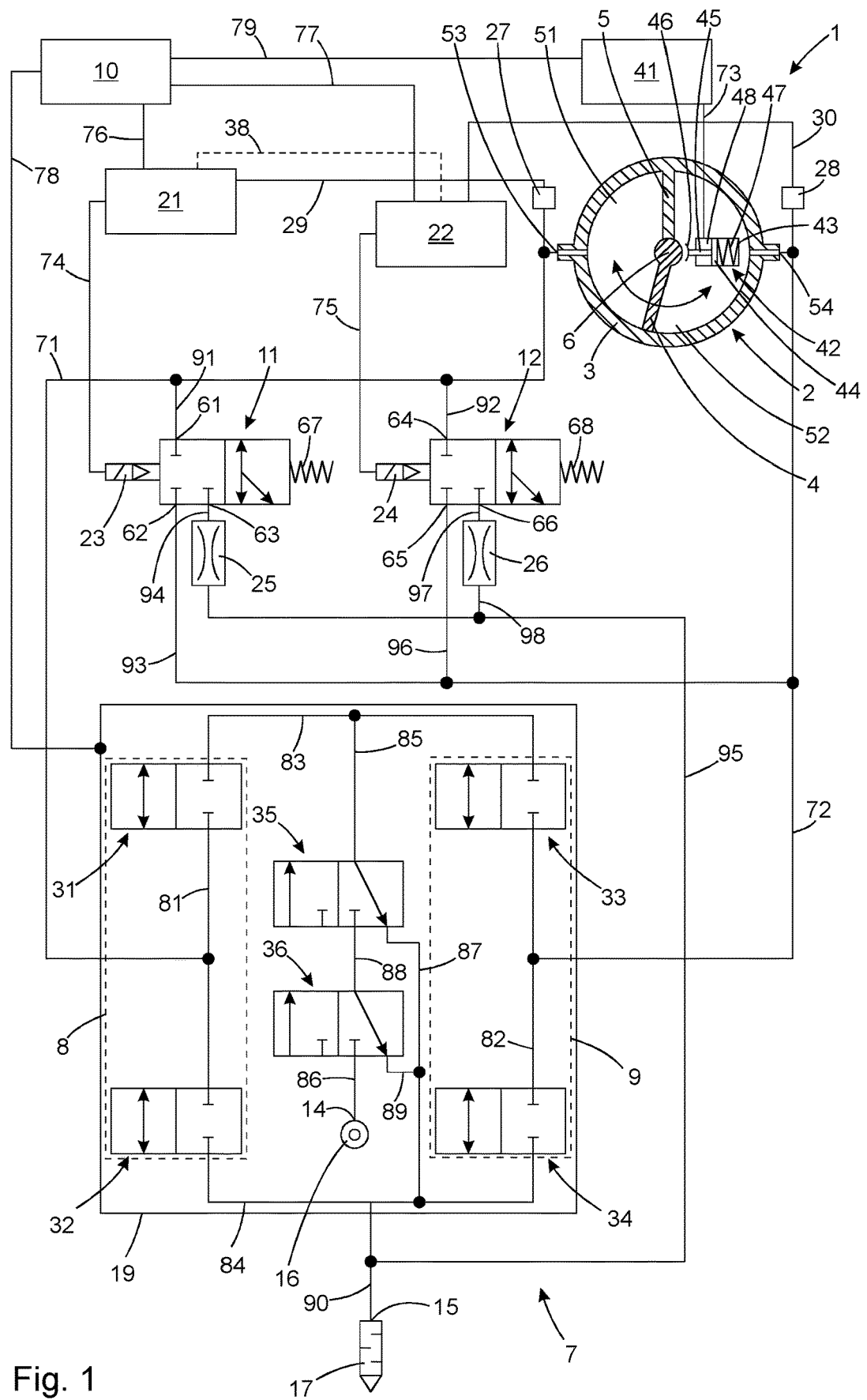
FIG. 1 a schematic representation of a pivot joint with a pivot actuator and a valve arrangement.

A pivot joint 1 shown purely schematically in FIG. 1 is provided for use in a robot arm of an industrial robot and is used there for a pivot-movable and drivable coupling between two arm sections of the industrial robot.

Here, the pivot joint 1 forms a compact assembly that can preferably be connected completely independently to a preceding arm section and a subsequent arm section of the robot arm and only requires a pneumatic power supply and a supply of electrical control signals in order to be able to perform the desired pivot movements.

The pivot joint 1 comprises a pivot actuator 2, which is designed as a pneumatic pivot vane drive and which has a schematically shown, circular-cylindrical actuator housing 3 with a pivot vane 4 mounted in the actuator housing 3 so that it can pivot, as well as a separating web 5 arranged in a fixed position in the actuator housing 3. The pivot vane 4 is connected to an output shaft 6 which is arranged coaxially in the actuator housing 3 and which passes through the actuator housing 3 in a manner not shown in more detail and can be connected outside the actuator housing 3, for example, to an arm part of a robot arm. Furthermore, it can be provided that the actuator housing 3 is connected to a further arm part of a robot arm. Accordingly, a pivoting between the arm parts of the robot arm connected to the actuator housing 3 and the output shaft 6 can be realized by introducing a pivoting movement to the output shaft 6.

The pivot vane 4, together with the separating wing 5, divides a volume enclosed by the actuator housing 3 into a first variable-size working chamber 51 and a second variable-size working chamber 52, a size of the two working chambers 51, 52 being dependent on the respective pivoting position of the pivot vane 4. A first working port 53 is assigned to the first working chamber 51, via which pressurization and ventilation of the first working chamber 51 can be carried out. A second working port 54 is assigned to the second working chamber 52, via which the second working chamber 52 can be pressurized and vented.

Purely schematically, a brake 42 is located in the second working chamber 52, which comprises a brake housing 43 of purely exemplary circular-cylindrical design with a brake piston 44 received linearly therein and a coupling rod 45 connected to the brake piston 44, as well as a brake pad 46 connected to the coupling rod 45 and a biasing spring 47 received between the brake piston 44 and the brake housing 43. The brake housing 43, together with the brake piston 44 and the coupling rod sealingly mounted with respect to the brake housing 43, defines a variable-size fluid working chamber 48 which can be selectively pressurized or vented by a brake control 41 via a third fluid line to thereby effect a linear relative movement of the brake piston 44, the coupling rod 45 connected thereto, and the brake pad 46. The biasing spring 47 is configured to press the brake pad 46 against the output shaft 6 when the fluid working chamber 48 is vented, thereby coming into a positive engagement with the output shaft 6 or exerting a frictional force on the output shaft 6. When the fluid working chamber 48 is pressurized, the biasing spring 47 is compressed and a linear displacement of the brake piston 44 takes place together with the coupling rod 45 and the brake pad 46, which cancels the positive engagement or the frictional force on the output shaft 6.

For a pressurization and ventilation of the first working chamber 51, the first working port 53 is connected to a first fluid line 71, which in turn is connected to a first line section 81. For pressurization and ventilation of the second working chamber 52, the second working port 54 is connected to a second fluid line 72, which in turn is connected to a second line section 82.

The first line section 81 is connected to both a first control valve 31 and a second control valve 32, which form a first valve group 8. The second line section 82 is connected to both a third control valve 33 and a fourth control valve 34, forming a second valve group 9. The control valves 31 to 34 are designed purely exemplarily as 2/2-way switching valves. The control valves 31 and 33 are connected via the third line section 83 and the fifth line section 85 to a first shut-off valve 35, which in turn is connected via the seventh line section 87 to the fourth line section 84. Furthermore, the first shut-off valve 35 is connected via the eighth line section 88 to the second shut-off valve 36, which in turn is connected via the sixth line section 86 to a compressed air source 16 associated with the pressurization port 14 and via the ninth line section 89 to the seventh line section 87. By way of example, the first shut-off valve 35 and the second shut-off valve 36 are each designed as 3/2-way switching valves.

By means of the above-described fluidic connection of the first shut-off valve 35 and the second shut-off valve 36, the fifth line section 85 can optionally be brought into fluidic communicating connection with the fourth line section 84, whereby venting of the fifth line section 85 occurs. Alternatively, in the event that both the first shut off valve 35 and the second shut off valve 36 are switched from the vent position shown in FIG. 1 to a pressurization position, the fifth line section 85 may be in fluid communication with the compressed air source 16. The two shut-off valves 35, 36 thus represent a component of a safety-related compressed air supply for the pivot actuator 2, since an operation of the pivot actuator 2 only is enabled if the redundantly arranged shut-off valves 35, 36 function correctly.

The first control valve 31 can be used to establish a fluidic communicating connection between the third line section 83 and the first line section 81, provided that the first control valve 31 is switched from the blocking position shown in FIG. 1 to a release position. If this is the case and the two shut-off valves 35, 36 are also switched to the pressurization position, pressurization of the first working chamber 51 via the first line section 81 and the first fluid line 71 is enabled. In the same way, this applies to the function of the third control valve 33 with regard to the pressurization of the second working chamber 52 via the second line section 82 and the second fluid line 72.

The second control valve 32 can be used to establish a fluidically communicating connection between the fourth line section 84, which in turn is connected via the tenth line section 90 to the air outlet serving as a fluid sink and being provided with a silencer 17, and the first line section 81, provided that the second control valve 32 is switched from the blocking position shown in FIG. 1 to a release position. This allows venting of the first working chamber 51 via the first line section 81 and the first fluid line 71. Similarly, this applies to the function of the fourth control valve 34 with regard to venting the second working chamber 52 via the second line section 82 and the second fluid line 72.

As can be further seen from the representation of FIG. 1, a first valve port 61 of a first safety valve 11 is connected to the first fluid line 71 via an eleventh line section 91. Further, a second valve port 62 of the first safety valve 11 is connected to the second fluid line 72 via a thirteenth line section 93. A third valve port 63 of the first safety valve 11 is connected via a fourteenth line section 94 to a first choke 25, which in turn is connected via a fifteenth line section to the tenth line section 90 and thus to the exhaust port 15.

Similarly, the second safety valve 12 has its first valve port 64 connected to the first fluid line 72 via the twelfth line section 92, a second valve port 65 connected to the second fluid line 72 via the sixteenth line section 96 and the thirteenth line section 93, and its third valve port 66 connected to the second choke 26 via the seventeenth line section 97. The second choke 26 is in turn connected to the exhaust port 15 via the eighteenth line section 98 and the fifteenth line section 95.

Purely by way of example, the first safety valve 11 and the second safety valve 12 are each designed as 3/2-way switching valves. A first actuator 23 is assigned to the safety valve 11, which, purely by way of example, enables combined actuation of the first safety valve 11 by a solenoid valve and fluidic pilot control coupled thereto. The first actuator 23 is electrically connected via a first control line 74 to a first control 21, which is designed to provide electrical control signals to the first actuator 23. In the same way, a second actuator 24 is assigned to the second safety valve 12, which, purely by way of example, enables combined actuation of the second safety valve 12 by a solenoid valve and fluidic pilot control coupled therewith. The second actuator 24 is electrically connected via a second control line 75 to a second control 22, which is designed to provide electrical control signals to the second actuator 24. A first return spring 67 is assigned to the first safety valve 11, which transfers the first safety valve 11 from the closed position shown in FIG. 1 to an open or release position, as soon as the first actuator 23 is not activated. A second return spring 68 is assigned to the second safety valve 12, which moves the second safety valve 12 from the closed position shown in FIG. 1 to a release position as soon as the second actuator 24 is not activated.

Furthermore, a first pressure sensor 27 is electrically connected to the first control 21 via a first sensor line 29 to provide electrical sensor signals to the first control 21. Fluidically, the first pressure sensor 27 is connected to the first fluid line 71 and therefore enables pressure sensing at the first working port 53. A second pressure sensor 28 is electrically connected to the second control 22 via a second sensor line 30 to provide electrical sensor signals to the second control 22. Fluidically, the second pressure sensor 28 is connected to the second fluid line 72 to provide pressure sensing at the second work port 54.

The first control 21 is electrically connected via a third control line 76 to a valve control 10, which is designed for coordinated actuation of the first control 21, the valve group 19 connected via the fifth control line 78 and comprising the control valves 31 to 34 and the shut-off valves 35 and 36, the second control connected via the fourth control line 77, and the brake control 41 connected via the sixth control line 79. The valve group 19, together with the safety valves 11 and 12, forms a valve arrangement 7.

The valve control 10 can, for example, be connected to a robot control unit in more detail and to a separately formed safety control unit. It may be provided that the robot control provides the control commands for normal operation of the pivot joint 1 to the valve control 10, while the safety control may, for example, provide emergency stop signals to the valve control 10. The control commands can be directed both to a movement of the pivot actuator 2 and to a standstill of the pivot actuator 2, in particular using the brake 42. The emergency stop signals are directed to an emergency stop for the pivot actuator 2, which will be described in more detail below.

In a normal operating state for the pivot joint 1, it is provided that the valve control 10 is supplied with control commands by a higher-level robot control system and converts these control commands, for example, into pressure set points for the first working chamber 51 and the second working chamber 52, which are provided to the valve group 19 via the fifth control line. For monitoring the specified pressure set points, it can be provided that the valve control 10 interrogates the sensor signals of the first pressure sensor 21 and the second pressure sensor 28 from the respective controls 21 and 22 and thereby performs a pressure control for the working pressure in the first working chamber 51 and for the working pressure in the second working chamber 52. When a suitable pressure difference is provided between the first working chamber 51 and the second working chamber 52, a pivoting movement of the pivot vane 4 takes place and thus a pivoting relative movement of an arm part of a robot arm, which is coupled to the output shaft, with respect to a further arm part of the robot arm and is coupled to the actuator housing 3.

If the robot control requests a stop of the pivot joint, the valve control 10 optionally causes a pressure increase or a pressure decrease in one of the two working chambers 51, 52 in order to reduce a pressure difference between the two working chambers 51 and 52 to such an extent that no further movement of the pivot vane 4 takes place. In addition, the valve control 10 can provide a control signal to the brake control 41 via the sixth control line 79, which in turn can cause venting of the fluid working chamber 48 so that the brake pad 46 comes into positive engagement or frictional contact with the drive shaft 6.

In the event that an emergency stop signal is provided by the robot control to the valve control 10, all valves of the valve group 19, i.e. the control valves 31 to 34 and the control valves 35 and 36 are brought into the position as shown in FIG. 1. This means that fluid flow in the line sections 81 and 82 is no longer possible and there is neither an inflow nor an outflow of fluid from the valve group 19 into the two fluid lines 71 and 72.

Furthermore, the valve control 10 activates the first control 21 and the second control 22 immediately when the emergency stop signal is received, in order to transfer each of the first safety valve 11 and the second safety valve 12 from the blocked position shown in FIG. 1 to a release position. As soon as at least one of the two safety valves 11, 12 is in the release position, there is a fluidic communicating connection between the first working chamber 51 and the second working chamber 52, whereby a pressure balance is achieved between the two working chambers 51, 52. This pressure equalization prevents any further pivoting movement of the pivot vane 4. Furthermore, a pressure reduction takes place in the two fluidically communicating working chambers 51 and 52 via the respectively assigned choke 25, 26, whereby a reduction of the pressure energy takes place in the two working chambers 51, 52.

In addition, it can be provided that the valve control 10 provides a corresponding control signal to the brake control 41 when the emergency stop signal arrives, in order to effect a venting of the fluid working chamber 48 of the brake 42 and thus to apply a braking force to the output shaft 6.

When the pivot joint 1 is put into operation and additionally at regular intervals, provision can be made for a test procedure to be carried out in which the valve control 10 first causes a braking effect on the output shaft 6 by suitable control of the brake control 41 and then causes asymmetrical pressurization for the first working chamber 51 and the second working chamber 52 by suitable control of the valve group 19. In a further step, the valve group 19 is then transferred to the blocking state as shown in FIG. 1. The two safety valves 11 and 12 are then triggered by suitable actuation of the first control 21 and the second control 22, whereby the valve control 10 can detect a pressure curve or pressure progression of the pressure balance between the first working chamber 51 and the second working chamber 52 on the basis of the pressure signals of the first pressure sensor 27 and the second pressure sensor 28 and compare this pressure curve/progression with a stored curve/progression. If the actual course of the pressure balance largely corresponds to the stored pressure curve/progression, the test procedure is completed positively and the continued operation of the pivot joint 1 is not in question. If, on the other hand, there are deviations between the actual course and the stored course curve that exceed a stored threshold value, the valve control 10 issues an error message and locks the pivot joint 1.

To further increase safety, it can be provided that the first control 21 and the second control 22 are electrically connected to each other via an optional communication line 38 and can compare incoming control signals of the valve control 10 with each other. In this case, the first control 21 and the second control 22 can be configured in such a way that, if there are deviations between the incoming control signals of the valve control 10, the first safety valve 11 and the second safety valve 12 are automatically triggered in order to transfer the pivot joint 1 to a safe state.

The invention claimed is:

1. A pivot joint for a robot, comprising:
   a double-acting pneumatic pivot actuator, which has a first working chamber with a first working port and a second working chamber with a second working port, and
   further comprising a valve arrangement for a safety-related pneumatic control of the pivot actuator, having a first valve group for a selective connection of the first working port to one of a pressurization port and an exhaust port, and having a second valve group for a selective connection of the second working port to one of the pressurization port and the exhaust port, and
   which valve arrangement comprises a safety valve which is connected to the first working port and to the second working port and which is configured for blocking a connection between the first working port and the second working port in a blocking position and for releasing the connection between the first working port and the second working port in a release position,
   wherein the safety valve is connected to the exhaust port and is configured to block a connection between the first working port and the second working port and the exhaust port in the blocking position and is configured to release the connection between the first working port and the second working port and the exhaust port in the release position.

2. The pivot joint according to claim 1, wherein a choke is arranged between the safety valve and the exhaust port.

3. The pivot joint according to claim 2, wherein a choke cross section of the choke is larger than a supply cross section of the first valve group and larger than a supply cross section of the second valve group.

4. A pivot joint for a robot, comprising:
a double-acting pneumatic pivot actuator, which has a first working chamber with a first working port and a second working chamber with a second working port, and
further comprising a valve arrangement for a safety-related pneumatic control of the pivot actuator, having a first valve group for a selective connection of the first working port to one of a pressurization port and an exhaust port, and having a second valve group for a selective connection of the second working port to one of the pressurization port and the exhaust port, and
which valve arrangement comprises a safety valve which is connected to the first working port and to the second working port and which is configured for blocking a connection between the first working port and the second working port in a blocking position and for releasing the connection between the first working port and the second working port in a release position,
wherein the safety valve comprises an actuator acting on a valve member which is movably mounted in a valve housing of the safety valve for switching the valve member between the release position and the blocking position and wherein the safety valve comprises a spring acting on the valve member for prestressing the valve member into the release position.

5. The pivot joint according to claim 4, comprising a second safety valve which is arranged in parallel to the safety valve.

6. The pivot joint according to claim 5, wherein one of the two safety valves is assigned a first control for actuating the actuator of the safety valve, and wherein the other of the two safety valves is assigned a second control for actuating the actuator of this safety valve.

7. The pivot joint according to claim 6, wherein the first working port or the first working chamber is assigned a first pressure sensor that provides a first pressure signal to the first control, and wherein the second working port or the second working chamber is assigned a second pressure sensor that provides a second pressure signal to the second control.

8. The pivot joint according to claim 7, wherein a brake biased into a braking position and a brake control for switching over the brake between the braking position for the pivot actuator and a release position for the pivot actuator are assigned to the pivot actuator.

9. The pivot joint according to claim 8, wherein the brake control and the first valve group and the second valve group and the first control and the second control are each electrically connected to a valve control, which is configured to carry out a test procedure, in which the brake control activates a braking state for the pivoting actuator and in which the first valve group and/or the second valve group enable an asymmetrical pressurization of the pivoting actuator and in which at least one safety valve is switched over from the blocking position into the release position, and in which a pressure change at the first working port and/or at the second working port is monitored.

* * * * *